(12) United States Patent
Cheswick

(10) Patent No.: US 6,397,270 B1
(45) Date of Patent: May 28, 2002

(54) SYSTEM FOR INDIRECT COMMUNICATION BETWEEN TWO COMPUTERS, EACH HAVING WRITE ACCESS TO ITS OWN PORTION OF A DUAL-ACCESS DISK DRIVE AND READ ACCESS TO THE ENTIRE DRIVE

(75) Inventor: William Roberts Cheswick, Bernardsville, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/225,409

(22) Filed: Jan. 5, 1999

(51) Int. Cl.[7] .............................................. G06F 13/14
(52) U.S. Cl. ..................... 710/33; 711/147; 709/213; 709/212
(58) Field of Search ....................... 710/1, 33; 711/147; 709/212, 213

(56) References Cited

U.S. PATENT DOCUMENTS 5,247,616 A * 9/1993 Berggren et al. ............ 709/212
5,528,768 A * 6/1996 Bechstein et al. ........... 711/147
5,701,513 A * 12/1997 Kaneko ........................ 710/6
5,983,226 A * 11/1999 Commerford, Jr. et al. ..... 707/8
5,987,506 A * 11/1999 Carter et al. ................. 709/213
6,098,179 A * 8/2000 Harter, Jr. .................... 714/4
6,115,797 A * 9/2000 Kanda et al. ................ 711/147
6,138,248 A * 10/2000 Satio et al. ................... 714/11

* cited by examiner

Primary Examiner—Thomas Lee
Assistant Examiner—Abdelmoniem Elamin
(74) Attorney, Agent, or Firm—Priest & Goldstein, PLLC

(57) ABSTRACT

A system for secure data transfer using a dual-access disk drive. The disk drive is connected to a first computer and a second computer. The first computer may be connected to a first network and the second computer may be connected to a second network. Each of the first computer and the second computer has write access to a portion of the disk drive, different from the portion to which the other computer has write access, and read access to the entire disk drive. The first computer transfers data to the second computer by placing data on the disk to be read by the second computer. Similarly, the second computer transfers data to the first computer by placing data on the disk to be read by the first computer. The first computer and the second computer can transfer data without any direct physical connection or communication. The disk drive is adapted to control access, preventing conflicting attempts at access by the first disk drive and the second disk drive.

15 Claims, 3 Drawing Sheets

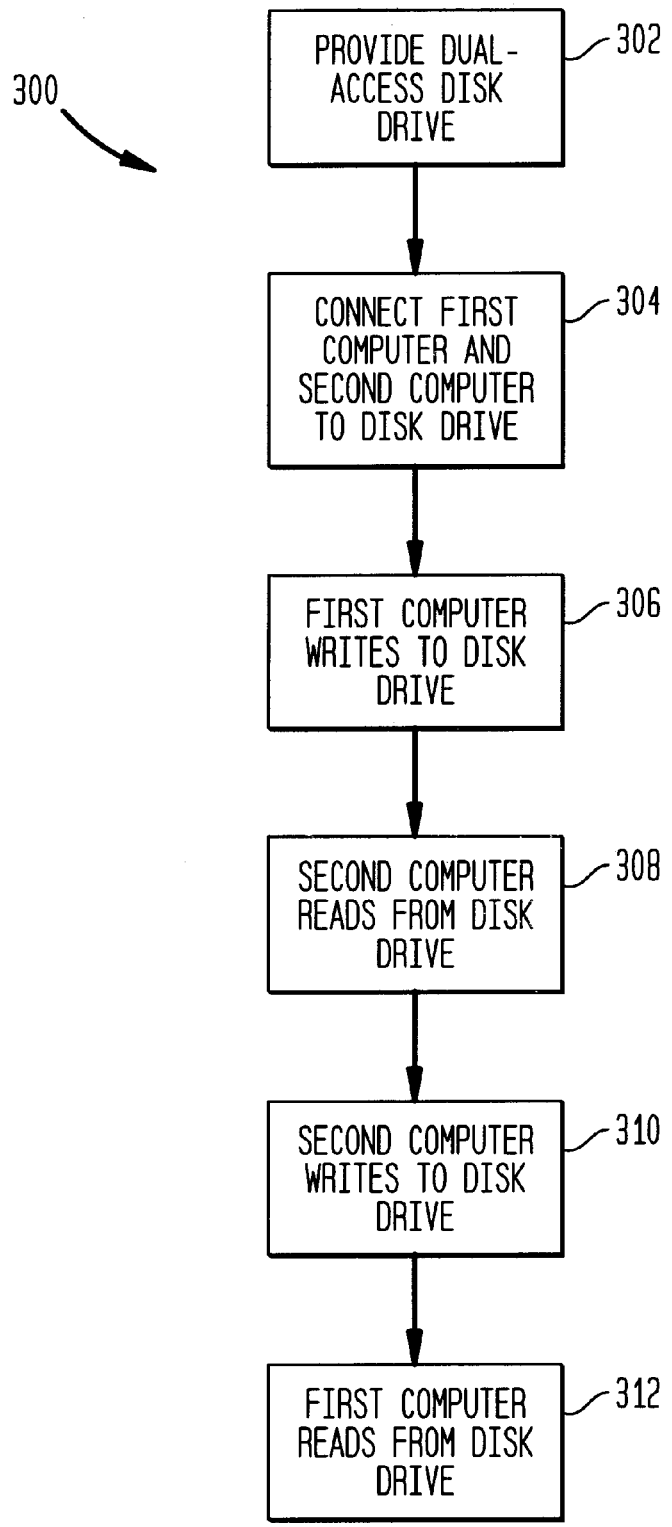

SYSTEM FOR INDIRECT COMMUNICATION BETWEEN TWO COMPUTERS, EACH HAVING WRITE ACCESS TO ITS OWN PORTION OF A DUAL-ACCESS DISK DRIVE AND READ ACCESS TO THE ENTIRE DRIVE

FIELD OF THE INVENTION

The present invention relates generally to improvements to secure information transfer. More particularly, the invention relates to an advantageous dual-access disk drive system for secure transfer of information between different entities.

BACKGROUND OF THE INVENTION

Immense amounts of information need to be transferred daily. Much of this information must be transferred between different entities, such as corporations, who have no fiduciary relationship toward one another, and which may be competitors which do not trust one another. Often a customer will need to transfer large amounts of information to a vendor, and the vendor will work with the information and transfer a finished product to the customer. The finished product may likewise be an information-intensive product whose value lies primarily in the information it contains. There is an ongoing need for convenient and rapid information transfer, which is best met in many cases, by electronic transfer. This includes transfer of computer files, which are able to contain or represent many different types of information. Transferring information between computers in the form of computer files is one of the fastest and easiest ways to transfer large amounts of information.

Between two parts of the same organization, data transfer can be accomplished by implementing a computer network and connecting each part of the organization to a computer network. Transfer over a network does, involve a degree of complexity because of the need to implement network protocols for information transfer, which require application programs for their implementation. Data transfer between different organizations, such as business competitors, requires successful processing and transfer of the data, with additional complexity introduced because of the need to address security concerns.

In order to provide for convenient information access and transfer, many organizations have established computer networks, connecting a number of computers in their organization to one another or to a central server. Connecting computers to one another raises questions concerning security of confidential information, or integrity of supplied information, as well as the possibility of attempts to gain unauthorized access to control functions of the network. Network security can be preserved by controlling physical access to computers connected to the network, allowing access to connected computers only to authorized persons. Typically, and ideally for purposes of security, only persons employed by or loyal to the entity owning the network are allowed access to the network. Security concerns arise when it is desired to transfer information to an outside person or entity separate from, and having no loyalty to, the entity owning the network. The outside entity may similarly have legitimate concerns about allowing access to its network or computers.

It is possible to provide data security through encryption, but this adds additional complexity to the data transfer process, and it is possible that flaws may exist in the particular encryption scheme chosen, allowing compromise of the data. It is also possible to transfer information through physical transfer of removable media, but this slows the process and increases inconvenience. Moreover, it may be advantageous for two computer systems or networks to directly exchange information rapidly under automated control with little or no human intervention. Reliance on transfer of removable media is incompatible with such direct exchange of information.

There exists, therefore, a need in the art for a high-speed, large-volume data exchange mechanism, providing physical isolation between computer systems controlled by different entities, which can be implemented with a minimum of complexity in data handling and transfer.

SUMMARY OF THE INVENTION

A data transfer system and method according to the present invention employs a dual-access disk drive adapted to allow simultaneous access by two or more different computers. The disk drive is adapted to allow each computer write access to a portion of the disk and read access to the entire disk. Each computer connected to the disk drive is allowed write access to a separate portion of the disk. The disk serves as a repository of information. Each of the different computers writes information to the disk, the information being readable by the other of the different computers. It is thus possible for two separate computers to transfer information by depositing and retrieving the information in a jointly accessible location, without a need for either computer to have a direct connection or access to the other computer. This provides physical security to each computer, as each computer is physically isolated from the other computer. The disk is adapted to prevent conflicting access by the different computers, for example, attempts by different ones of the different computers to read or write the disk inappropriately. The data transfer is accomplished with a minimum of complexity, because the data is transferred through direct physical connection to the repository of information, without the need for complex networking protocols.

A more complete understanding of the present invention, as well as further features and advantages of the invention, will be apparent from the following Detailed Description and the accompanying drawings.

BRIEF DESCRIPTION OF THE DRAWINGS

FIG. 3 illustrates the steps of a method according to the present invention for transfer of information using a dual-access disk drive.

DETAILED DESCRIPTION

Figure 1:
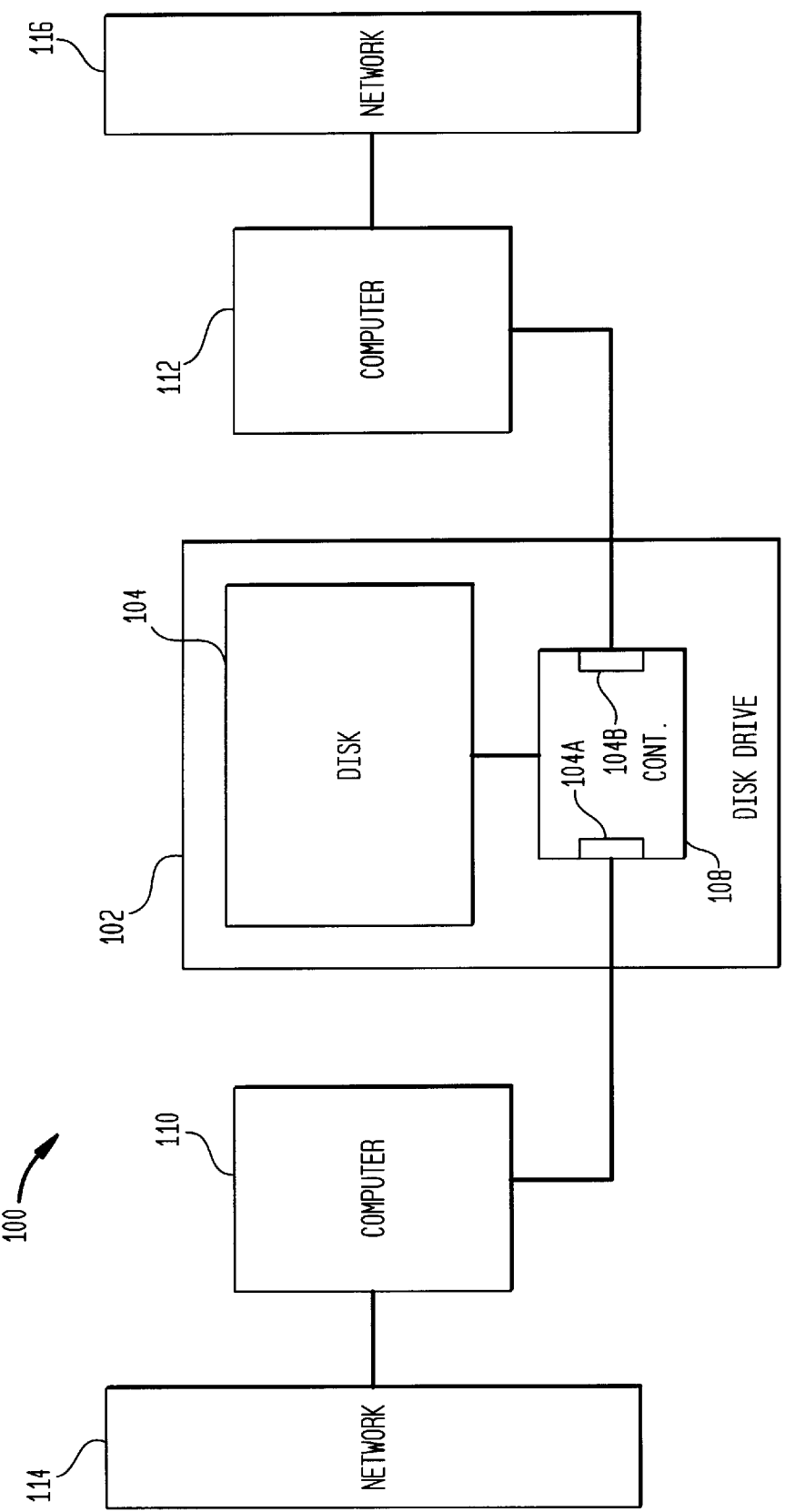
FIG. 1 illustrates a dual-access disk drive transfer system according to the present invention.

FIG. 1 illustrates a dual-access disk drive information transfer system 100 according to the present invention. The system 100 includes a disk drive 102 having a disk 104 and ports 104A and 104A. The ports 104A and 104B may suitably be included within a disk controller 108 which controls operation of the disk 104 and data transfer to and from the disk drive 102. The system 100 further includes a first computer 110 and a second computer 112. The first computer 110 and the second computer 112 are typically owned by separate entities. The first computer 110 is typically connected to a first network 114 and the second computer 112 is typically connected to a second network 116.

The first computer 110 and the second computer 112 communicate with the disk drive 102 via the controller 108. The first computer 110 and the second computer 112 transfer data to the controller 108 through the ports 104A and 104B, and also communicate with the controller 108 through the ports 104A and 104B. The computers 110 and 112 communicate requests to read and write to the disk 104, and these requests are received and answered by the controller 108, which controls disk access and prevents conflicts such as attempts by both of the computers 110 and 112 to read or write to the disk 102 at the same time. Preferably the computers 110 and 112 would each be located a short physical distance from the disk drive 102, typically on the order of a few feet away, and be physically connected to the disk drive 102. Each of the computers 110 and 112 would be connected to its network 114 or 116, respectively, through a network interface. Each of the computers 110 and 112 sees the disk drive 102 as simply another disk drive attached to it. Moreover, it is possible to set up the networks 114 and 116 so that each computer on the network 114 sees the disk drive 102 as simply another volume on the network 114, and each computer on the network 116 likewise sees the disk drive 102 as another volume on the network 116. The fact that the disk drive 102 is connected to more than one computer is transparent to each of computers 110 and 112. When it is desired to transfer data from the network 114 to the network 116, an appropriate computer on the network 114 simply directs the writing of a file to the disk drive 102, and then an appropriate computer on the network 116 directs the reading of the file from the disk drive 102. The controller 106 handles the read and write requests and prevents conflicts.

Provisions may suitably be made in the networks 114 and 116 to warn users that the disk drive 102 is accessible by a separate network. For example, a dialog box may appear with a security alert reminding a user who attempts to transfer a file to the disk drive 102 that the disk drive 102 is accessible by another entity, and asking for confirmation that the user really does intend to transfer the file to the disk drive 102. Additionally, each of the networks 114 and 116 may log transfers of files to the disk drive 102.

Figure 2:
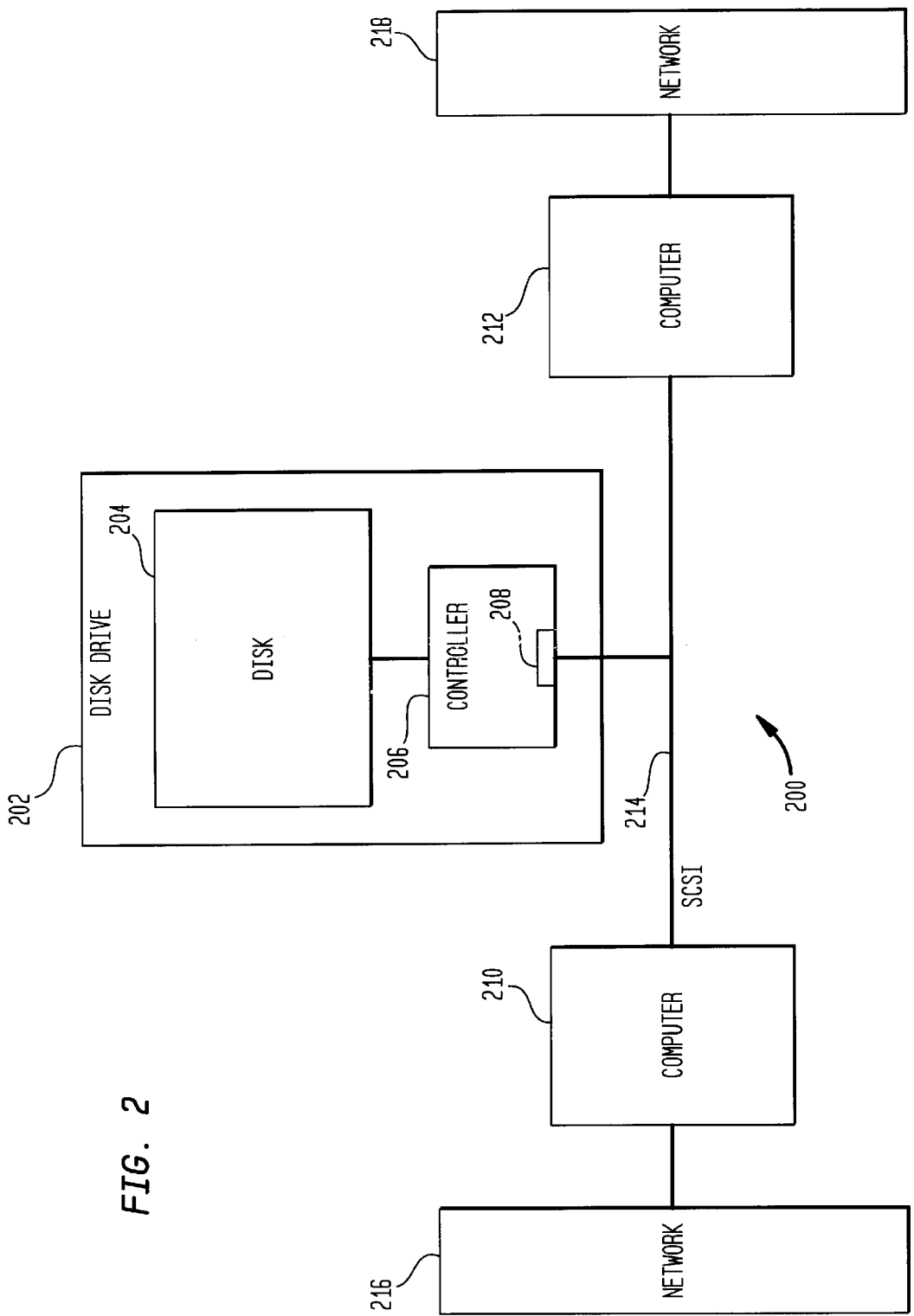
FIG. 2 illustrates an alternative embodiment of a dual-access disk drive transfer system according to another aspect of the present invention.

FIG. 2 illustrates a secure data transfer system 200 according to another aspect of the present invention. The system 200 includes a disk drive 202, which preferably includes a disk 204 and a controller 206. The controller 206 controls operation of the disk drive 202 and transfers data to and from the disk drive 202 through a port 208. The data transfer system 200 also includes a first computer 210 and a second computer 212. The system 200 also includes a Small Systems Control Interface (SCSI) connection 214 between the first computer 210 and the second computer 212. The disk drive 202 is also connected to the SCSI connection 214, through the port 208, so that the SCSI connection 214 serves as a connection between the disk drive 202 and each of the first computer 210 and the second computer 212.

FIG. 3 illustrates the steps of a method 300 for secure data transfer according to the present invention. At step 302, a dual access disk drive is provided, similar to the disk drive 102 of FIG. 1. At step 304, a first computer and a second computer are connected to the disk drive, with each of the first computer and the second computer having write access to a preassigned segment of the disk drive, for example half, and each of the first computer and the second computer having read access to the entire disk drive. While read access to the entire disk is presently preferred, read access may be limited to a preassigned segment less than the entire disk, but greater than the write access segment. Each of the first and second computers may be connected to a first and second network, respectively. At step 306, the first computer writes data to the dual-access disk drive. The data written to the dual-access disk drive by the first computer may be data provided to the first computer by the first network. At step 308, the second computer reads data from the dual access disk drive. The second computer may provide the data read from the dual-access disk drive to the second network.

At step 310, the first computer reads data from the dual-access disk drive. The data read from the dual-access disk drive by the first computer may be provided to the first network by the first computer. At step 312, the second computer writes data to the dual access disk drive. The data written to the dual-access disk drive by the second computer may be data provided to the second computer by the second network. Steps 306–312 need not be, and typically are not, executed in sequence, but rather each step is executed individually as one or the other of the first or second computers needs to read data from or write data to the dual-access disk drive. During each of steps 306–312 the dual-access disk drive controls operation and prevents conflicts such as simultaneous attempts at access by each of the first computer and the second computer.

While the present invention is disclosed in the context of a presently preferred embodiment, it will be recognized that a wide variety of implementations may be employed by persons of ordinary skill in the art consistent with the above discussion and the claims which follow below. For example, a data transfer system comprising two computers has been disclosed for simplicity of discussion, but transfer systems including greater numbers of computers may be envisioned designed consistent with the present invention.

I claim:

1. A secure data transfer system comprising:
    a first computer;
    a second computer having no direct communication with the first computer;
    a dual-access disk drive connected to the first computer and the second computer, the disk drive having a dual-read portion read-accessible by the first computer and the second computer, a first write-accessible portion of the dual-read portion being write-accessible by the first computer and not by the second computer and a second write-accessible portion of the dual-read portion being write-accessible by the second computer and not by the first computer, the first write-accessible portion being different and segregated from the second write-accessible portion, the dual-access disk drive being operative to provide secure data transfer between the first computer and the second computer by receiving data written by the first computer and allowing the second computer to read the data written by the first computer and receiving data written by the first computer and allowing the first computer to read the data written by the second computer, the disk drive being operative to provide and coordinate data transfer between the first computer and the second computer on the basis of commands delivered to the disk drive by the first computer and the second computer without there being any direct communication between the first computer and the second computer.

2. The data transfer system of claim 1 wherein the dual-read portion includes the entire disk drive.

3. The data transfer system of claim 2 wherein the first computer is connected to a first network and the second computer is transferred to a second network, the first network and the second network being operative to transfer data to and from the first computer and the second computer, respectively, for transfer from the first computer to the second computer and from the second computer to the first computer.

4. The data transfer system of claim 3 wherein each of the first network and the second network issues a warning to a user that the dual-access disk drive is accessible by another network when the user issues a command to transfer data to the dual-access disk drive.

5. The data transfer system of claim 4 wherein each of the first network and the second network logs all transfers to the dual-access disk drive originating from that network.

6. A method of secure data transfer comprising:

connecting a dual-access disk drive to a first computer having write-access to a first portion of the disk drive and read-access to the entire disk drive;

connecting to the disk drive a second computer having write-access to a second portion of the disk drive different from the portion of the disk drive to which the first computer has write-access, and read-access to the entire disk drive, the first computer and the second computer having no direct connection to one another;

writing data from the first computer to the disk drive for reading by the second computer;

reading data from the disk drive to the second computer;

writing data from the second computer to the disk drive for reading by the first computer;

reading data from the disk drive to the first computer; and managing reading and writing of the disk drive to prevent conflicts without direct communication between the first computer and the second computer.

7. The method of claim 6 and also including the step of connecting a first network to the first computer and connecting a second network to the second computer.

8. The method of claim 7 wherein the step of writing data from the first computer to the disk drive is preceded by a step of transferring data from the first network to the first computer for writing to the disk drive.

9. The method of claim 8 wherein the step of reading data from the disk drive to the second computer is followed by a step of transferring data from the second computer to the second network.

10. The method of claim 9 wherein the step of writing data from the second computer to the disk drive is preceded by a step of transferring data from the second network to the second computer for writing to the disk drive.

11. The method of claim 10 wherein the step of reading data from the disk drive to the first computer is followed by a step of transferring data from the first computer to the first network.

12. The method of claim 11 wherein the step of transferring data from the first network to the first computer is preceded by a step of issuing a warning that the disk drive is accessible by another network.

13. The method of claim 12 wherein the step of transferring data from the second network to the second computer is preceded by a step of issuing a warning that the disk drive is accessible by another network.

14. The method of claim 13 wherein the step of transferring data from the first network to the first computer is followed by a step of logging the transfer.

15. The method of claim 14 wherein the step of transferring data from the second network to the second computer is followed by a step of logging the transfer.

* * * * *